Figure 1:
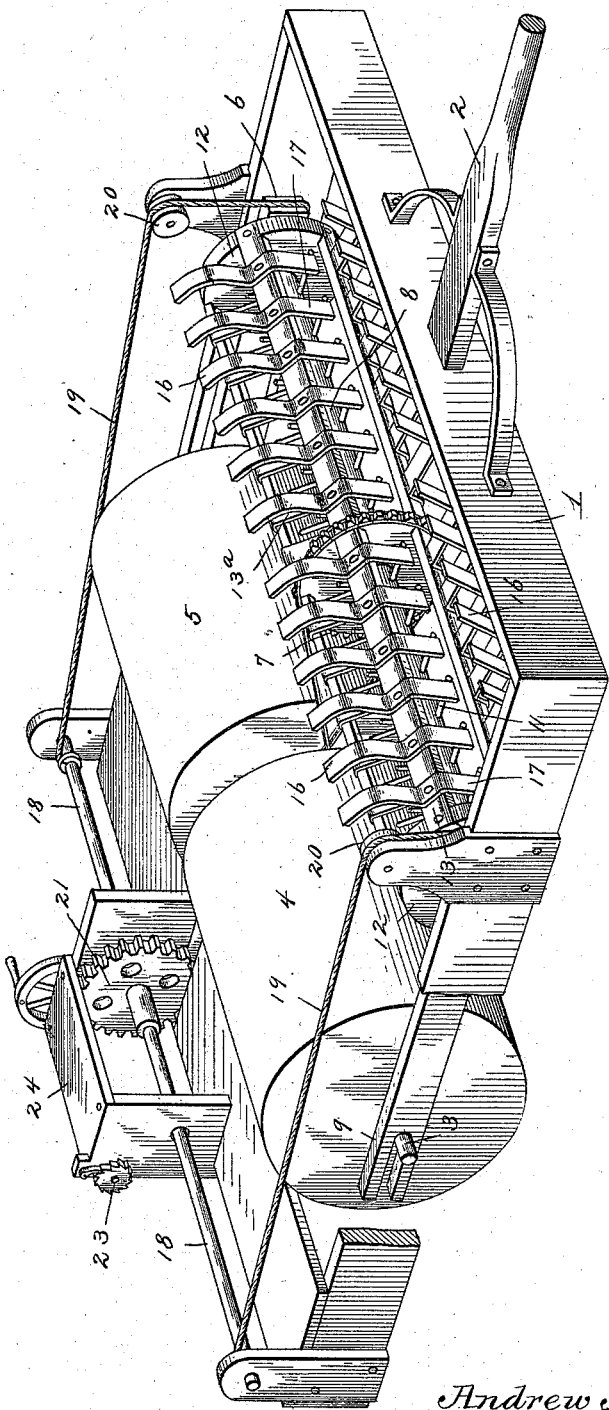

(No Model.) 2 Sheets—Sheet 1.

A. J. HARLOW.
CLOD CRUSHER.

No. 562,397. Patented June 23, 1896.

Witnesses
Harry L. Amer.
J. F. F. Riley

Inventor
Andrew J. Harlow,
By his Attorneys,
C. A. Snow & Co.

(No Model.) 2 Sheets—Sheet 2.
A. J. HARLOW.
CLOD CRUSHER.
No. 562,397. Patented June 23, 1896.
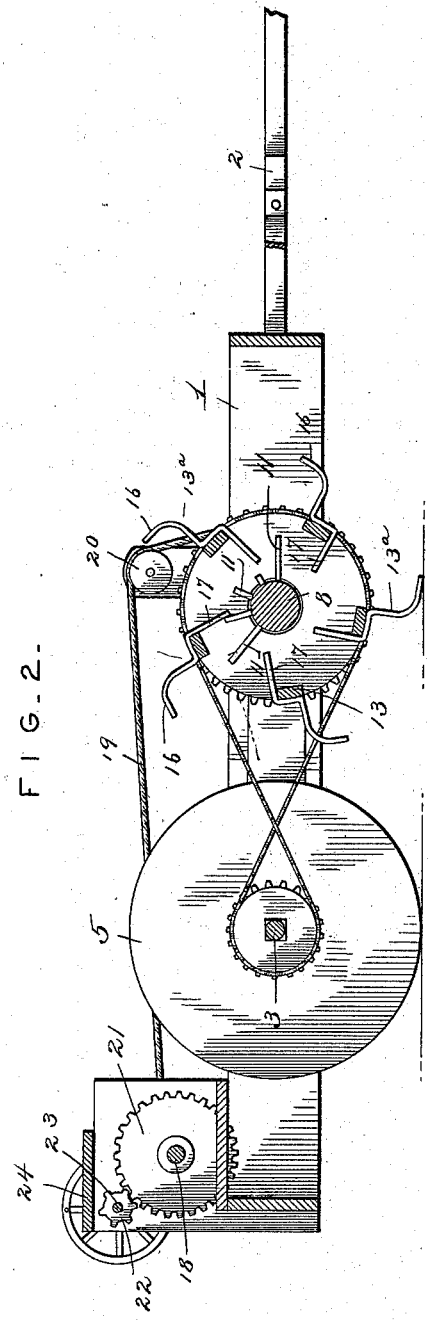
Witnesses
Harry L. Ames
H. F. Riley
By his Attorneys,
C. A. Snow & Co.
Inventor
Andrew J. Harlow.

UNITED STATES PATENT OFFICE.

ANDREW J. HARLOW, OF SPARKSVILLE, INDIANA, ASSIGNOR TO WILLIAM A. HOLLAND, OF FORT RITNER, INDIANA.

CLOD-CRUSHER.

SPECIFICATION forming part of Letters Patent No. 562,397, dated June 23, 1896.

Application filed October 3, 1895. Serial No. 564,530. (No model.)

*To all whom it may concern:*

Be it known that I, ANDREW J. HARLOW, a citizen of the United States, residing at Sparksville, in the county of Jackson and State of Indiana, have invented a new and useful Clod-Crusher, of which the following is a specification.

This invention relates to improvements in clod-crushers.

The object of the present invention is to improve the construction of clod-crushers, and to provide a simple, inexpensive, and efficient one capable of operating as a harrow, pulverizer, and roller, and adapted to be readily adjusted to operate properly on the soil and to clear stumps and other obstructions.

The invention consists in the construction and novel combination and arrangement of parts hereinafter fully described, illustrated in the accompanying drawings, and pointed out in the claims hereto appended.

In the drawings, Figure 1 is a perspective view of a clod-crusher constructed in accordance with this invention. Fig. 2 is a longitudinal sectional view of the same. Fig. 3 is a transverse sectional view.

Like numerals of reference indicate corresponding parts in all the figures of the drawings.

1 designates a rectangular supporting-frame to which is connected a pole 2, and in which is journaled a transverse shaft or axle 3, arranged in rear of the center of the pole and having mounted on it rollers 4 and 5. The roller 4 rotates freely on the shaft 3, while the other roller, 5, is fixed to the shaft and is adapted to cause a rotation of the same when the clod-crusher moves forward to impart motion to the pulverizing mechanism which is located in advance of the rollers and which is pivotally connected with the main frame.

The pulverizing devices comprise a pivoted frame 6 and a rotating drum 7. The pivoted frame consists of a transverse beam 8 and side pieces disposed longitudinally of the main frame and arranged at the inner faces of the sides thereof, and having their rear ends 9 bifurcated and removably journaled on the ends of the shaft 3, and the drum 7 rotates on the transverse beam. The pivoted frame is adapted to be raised and lowered to adjust the pulverizing devices and to enable them to clear obstructions and the transverse beam is provided at its upper face with fixed teeth 11. This transverse beam is round and the teeth are radially disposed and vary in length, the shortest one being at the top, or near the top, and the longest being in the rows at the end of the series. Any suitable number of rows of teeth may be provided and the clods and lumps of the soil are carried upward by the drum and are dropped upon the radial teeth 11.

The rotating drum is composed of end disks 12 and transverse bars 13, on which are mounted arms 13ª, arranged at intervals and having curved outer portions 16 and inner straight portions 17. The curved outer portions 16 form rakes or shovels adapted, as the machine moves forward, to pick up the clods and lumps and dump them upon the fixed teeth of the pivoted frame, and the straight inwardly-extending portions 17 of the arms 13ª are disposed opposite the intervals or spaces between the fixed teeth 11 and rotate between the same and crush and grind the soil and cause the same to drop from the machine in a finely-pulverized condition. After the soil has been crushed and pulverized, it is operated on by the rollers 4 and 5.

Any suitable gearing may be employed for transmitting motion from the shaft 3 to the drum 7, sprocket-wheels being preferably provided and arranged at the centers of the shaft 3 and the drum 7, and receiving a suitable sprocket-chain.

The raising and lowering of the pivoted frame is effected by means of a transverse windlass-shaft 18, journaled in suitable bearings at the back of the main frame and disposed transversely thereof and connected with a pair of cables or ropes 19, which extend forward and pass over pulleys 20, and are connected with the front ends of the sides of the pivoted frame. The transverse windlass-shaft is rotated by suitable gearings preferably consisting of a gear-wheel 21, mounted on the windlass-shaft, and a pinion 22, fixed to a counter-shaft 23, provided with a hand-wheel or crank-handle and having a pawl and ratchet to secure the pulverizing devices at the desired elevation.

A seat 24 for the accommodation of the driver is mounted on the main frame at the back thereof, and the hand-wheel for operating the elevating mechanism, and the pawl and ratchet are located adjacent to the seat within easy reach of the driver to enable the pivoted frame to be adjusted without stopping the machine.

It will be seen that the machine is simple and inexpensive in construction, that it is positive and reliable in operation, and that it operates as a harrow, pulverizer, and roller. It will also be apparent that the pulverizing and clod-crushing devices are capable of vertical adjustment to enable them to operate on the soil properly, and to clear stumps and other obstructions to avoid injury to the machine.

Changes in the form, proportion, and minor details of construction may be resorted to without departing from the principle or sacrificing any advantages of the invention.

What I claim is—

1. In a machine of the class described, the combination of a rotating drum, a series of fixed teeth, arranged within the drum and located at intervals, and arms mounted on the drum and having outer portions to lift the clods, and provided with inner portions arranged to rotate between the said teeth, substantially as and for the purpose described.

2. In a machine of the class described, the combination of a beam provided with fixed teeth arranged at intervals, a drum rotating on the beam, and arms mounted on the drum and provided with curved or bent outer portions to form shovels, and having straight inner portions arranged to rotate between the said teeth, substantially as described.

3. In a machine of the class described, the combination of a beam provided on its upper face with fixed radially-disposed teeth, the rotating drum composed of end pieces, and transverse bars connecting the end pieces, and teeth arranged at intervals on the transverse bars, and extending outward therefrom to form shovels, and projecting inward to coöperate with the fixed teeth, substantially as described.

4. In a machine of the class described, the combination of a main frame, a shaft journaled thereon, rollers mounted on the shaft and communicating motion thereto, a pivoted frame comprising a transverse beam, and side bars having their rear ends journaled on said shaft, a drum mounted on the beam and capable of rotation, arms carried by the drum, teeth fixed to the said beam and located within the drum, and coöperating with the said arms and elevating mechanism adapted to raise and lower the pivoted frame, substantially as described.

5. In a machine of the class described, the combination of a main frame, a shaft journaled thereon, rollers mounted on the shaft, an adjustable frame having sides provided at their rear ends with slots, and detachably arranged on said shaft and hinged to the same, a rotary drum mounted on the adjustable frame and carried by the same, a seat-frame mounted on the main frame at the back thereof, a windlass-shaft journaled on the main frame and extending transversely thereof at opposite sides of the said frame, pulleys mounted on the main frame and located above the drum at the ends thereof, ropes or cables located at opposite sides of the machine and connected at their rear ends to the windlass-shaft, and passing over the said pulleys, and having their front ends connected with the sides of the adjustable frame, and means for operating the windlass-shaft, substantially as described.

In testimony that I claim the foregoing as my own I have hereto affixed my signature in the presence of two witnesses.

ANDREW J. HARLOW.

Witnesses:
SHERMAN D. HILL,
ISHMAL T. LEE.